(12) United States Patent
Monsorno

(10) Patent No.: US 6,487,064 B1
(45) Date of Patent: Nov. 26, 2002

(54) BYPASS CIRCUIT WITH BURIED ISOLATED ELECTRODE

(75) Inventor: Richard V. Monsorno, Jacksonville, FL (US)

(73) Assignee: American Technical Ceramics Corporation, NY (US)

( * ) Notice: Subject to any disclaimer, the term of this patent is extended or adjusted under 35 U.S.C. 154(b) by 0 days.

(21) Appl. No.: 09/950,222

(22) Filed: Sep. 10, 2001

Related U.S. Application Data

(63) Continuation-in-part of application No. 09/596,673, filed on Jun. 19, 2000, now Pat. No. 6,337,791.

(51) Int. Cl.$^7$ .............................................. H01G 4/228
(52) U.S. Cl. ................................. 361/306.1; 361/306.2; 361/310; 361/312; 29/25.41
(58) Field of Search ........................ 361/303, 306.1, 361/308.1, 310, 309, 311–313, 321.2, 321.3, 306.2; 29/25.42, 25.41

(56) References Cited

U.S. PATENT DOCUMENTS 4,801,904 A * 1/1989 Sakamoto et al. .......... 333/182
4,906,512 A * 3/1990 Roess ....................... 156/89.17
5,561,586 A * 10/1996 Tomohiro et al. ........... 333/172

* cited by examiner

Primary Examiner—Anthony Dinkins
(74) Attorney, Agent, or Firm—Charles E. Baxley

(57) ABSTRACT

A bypass circuit includes a planar electrode layer which is mounted between a pair of dielectric layers. The electrode layer generally is centered inwardly with respect to the dielectric layers leaving an outward margin of dielectric material. One of the dielectric layers has two spaced apart contact members, each having a different polarity from the other. A resistive layer is centered on the other dielectric layer. The contact members extend onto end portions of the dielectric layers and electrically connect to opposite ends of the resistive layer. The electrode layer is isolated from electrical contact with any conductor and is buried within the dielectric layers. The electrode layer, in combination with the dielectric layer on which the contact members are mounted and the contact members, allow development of a selected value of capacitance between the contact members. Providing trimmed contact members as well as controlling their size and spacing allow for convenient preselection of desired operative characteristics of the bypass circuit. The contact members could be positioned on a substrate to which a buried electrode is mounted.

19 Claims, 5 Drawing Sheets

BYPASS CIRCUIT WITH BURIED ISOLATED ELECTRODE

CROSS-REFERENCE

The present Application is a continuation-in-part of Applicant's U.S. patent application Ser. No. 09/596673, filed Jun. 19, 2000 now U.S. Pat. No. 6,337,791.

FIELD OF THE INVENTION

This invention relates generally to bypass circuits and more particularly to a bypass circuit incorporating a ceramic capacitor which utilizes a buried layer.

BACKGROUND OF THE INVENTION

Prior art relating to solid state capacitors includes such patents as U.S. Pat. No. 4,665,465 to Tanabe and U.S. Pat. No. 5,107,394 to Naito et al. Construction of these capacitors includes multiple electrode layers which are fastened by means of a soldering process to a mechanical end cap. A soldering process introduces a degree of unreliability as a result of residual stresses formed in a capacitor during its manufacture. Additional unreliability results from stresses which are imposed on a solder joint due to differential rates of thermal expansion and contraction of various components of the capacitor; including its electrode, its dielectric material, its solder material and its end cap; when the capacitor is exposed to temperature variations and extremes, with or without stressful influences, during use. Also relevant is U.S. Pat. No. 5,576,926 to the present Application.

SUMMARY OF THE INVENTION

It is an object of the present invention to provide a bypass circuit that is particularly effective at very high frequencies.

Another object of the invention is to provide a bypass circuit which performs with highly reliability.

Another object of the invention is to provide a bypass circuit which is capable of highly reliability over a broad range of operating temperatures.

Yet another object of the invention is to provide a bypass circuit which can be manufactured in quantity at a low unit cost while maintaining high levels of quality.

The foregoing and other objects and advantages of the invention will appear more clearly hereinafter.

In accordance with the invention there is provided a bypass circuit which includes a planar electrode layer mounted between a pair of dielectric layers. Length and width dimensions of the dielectric layers are somewhat greater than corresponding length and width dimensions of the electrode layer and the electrode layer generally is centered with respect to the dielectric layers. One layer of the pair of dielectric layers has a pair of spaced apart contact members, each having a different polarity from the other. A resistive layer is mounted onto the other dielectric layer. The contact members extend onto end portions of the dielectric layers and electrically connect to opposite ends of the resistive layer. The contact member design helps facilitate testing of the circuit. The dielectric layer which is attached to the contact member has a selected thickness which allows the dielectric layer, in combination with the electrode layer, to develop a desired value of capacitance between the contact members. Similarly, the resistive layer has a selected dimension and thickness to develop a desired value of resistance in parallel with the capacitance value.

In an alternative embodiment of the invention, the electrode layer extends outwardly to connect to one of the contact members.

In another alternative embodiment of the invention, the pair of spaced apart contact members is replaced by a pair of metallized areas (each having a different polarity from the other) and the dielectric layer in combination with the electrode layer develop a desired value of capacitance between the two metallized areas. The metallized areas facilitate mounting the bypass circuit on a circuit board while using minimum surface area of the circuit board.

BRIEF DESCRIPTION OF THE DRAWINGS

Other important objects and advantages of the invention will be apparent from the following detailed description, taken in connection with an accompanying drawings in which.

DETAILED DESCRIPTION

Figure 1:
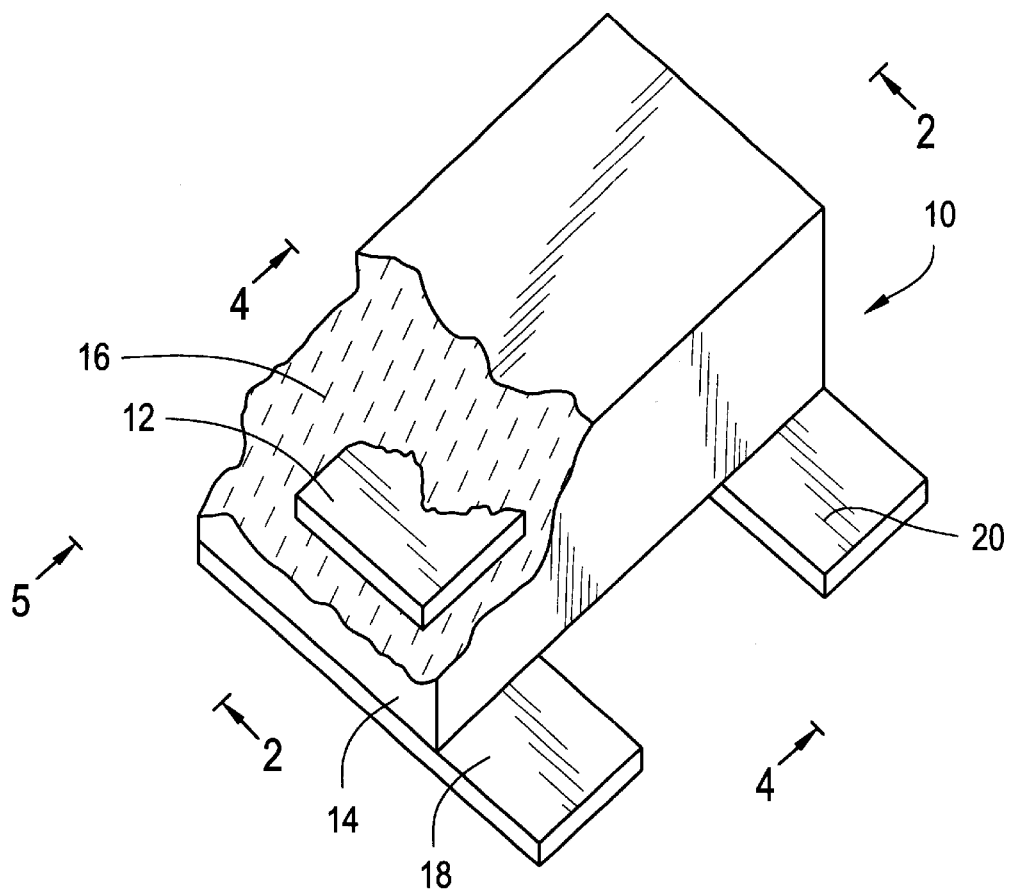
FIG. 1 is a generally downwardly looking perspective view of a buried layer capacitor made in accordance with the present invention and having a portion of the capacitor shown broken away to reveal details of internal construction.
Figure 2:
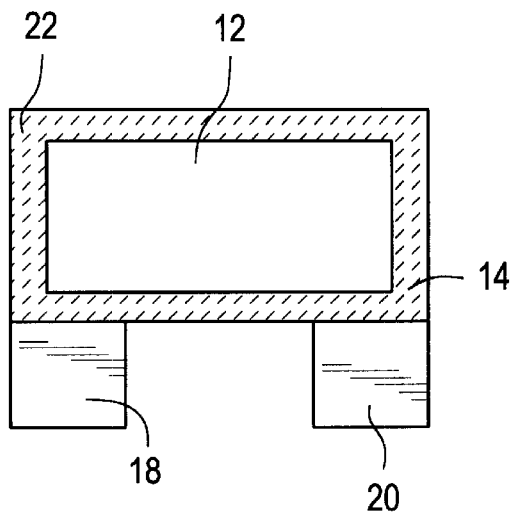
FIG. 2 is an elevational cross-sectional view taken along line 2—2 of FIG. 1.
Figure 3:
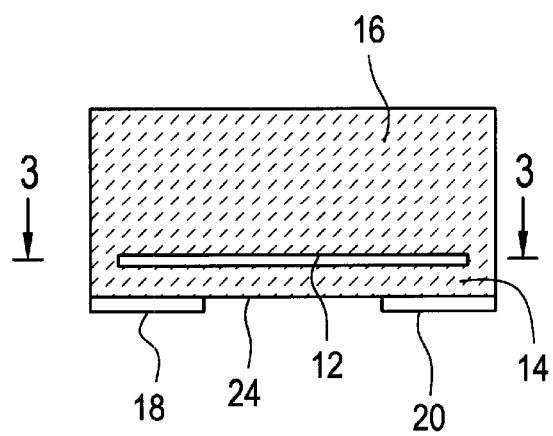
FIG. 3 is a planar cross-sectional view taken along line 3—3 of FIG. 2.
Figure 4:
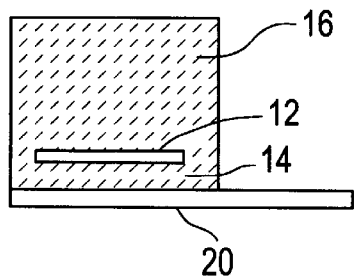
FIG. 4 is an elevational cross-sectional view taken along the line 4—4 of FIG. 1.
Figure 5:
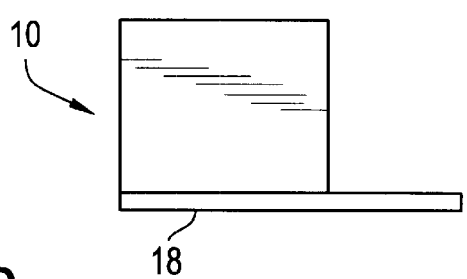
FIG. 5 is a side elevational view taken along the line 5—5 of FIG. 1.

With reference to the drawings, wherein like reference numbers designate like or corresponding parts throughout, there is shown in FIG. 1 a buried layer capacitor generally designated 10, made in accordance with the present invention, which includes an electrode layer 12, a first dielectric layer 14, a second dielectric layer 16 and a pair of contact members 18, 20, each of the contract members having a different polarity from the other;

The dielectric layers 14, 16 preferably are rectangular and as is shown in FIGS. 1 and 3, the electrode layer 12 also is generally rectangular, with length and width dimensions which are somewhat smaller than corresponding length and width dimensions of the dielectric layers 14, 16. The electrode layer 12 is planar and generally is centered relative to the dielectric layers 14, 16 resulting in a border, generally designated in FIG. 3 by the reference numeral 22, which surrounds the periphery of the electrode layer 12. The electrode layer 12 thus is completely contained or buried in the dielectric layers 14, 16. The electrode layer may be silver, gold, nickel, copper, palladium or another high conductivity metal or metals.

The contacts members 18, 20 are shown attached to a bottom surface 24 of the dielectric layer 14. The contacts members 18, 20 preferably are each planar and are made of any one of a number of metals which have a suitable combination of stiffness and conductivity. Appropriate materials for the contact members are copper and silver.

The dielectric layers 14, 16 are made of any one of a number of dielectric materials such as magnesium titanate, strontium titanate or barium titanate.

As is best seen from FIG. 1, the first dielectric layer 14 is disposed between the electrode layer 12 and the contacts members 18, 20. The contacts members 18, 20 have a preferred thickness which is in the order of 0.01 inches. The dielectric layer 14, in combination with the electrode layer 12 and the contacts members 18, 20, (each having a different polarity from the other) allow development of capacitance between the contacts members 18, 20.

The buried layer capacitor 10 of FIGS. 1–5 typically has the following dimensions which should be considered as given by way of illustration only and should not be considered as limiting in any way. Overall length of the capacitor 10 is in an order of 0.05 inches, its width is in an order of 0.05 inches, its height is in an order of 0.02 inches. Thickness of the dielectric layer 14 is in an order of 0.003 inches and thickness of the dielectric layer 16 is in an order of 0.017 inches.

The thickness of the dielectric layer 14 typically may range from 0.0005 inches to 0.01 inches in order to vary capacitance and the voltage rating of the capacitor 10.

The dimensions of the electrode layer 12 are typically as follows: length 0.045 inches, width 0.045 inches, and thickness 0.0001 inches.

Figure 6:
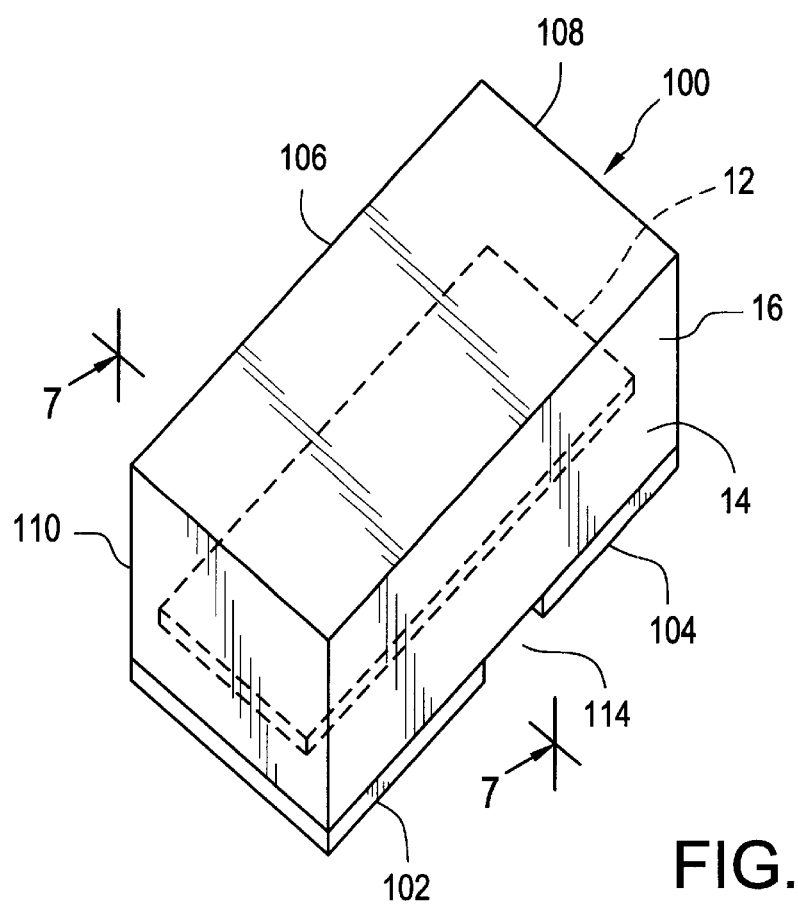
FIG. 6 is a generally downwardly looking perspective view of an alternative embodiment of the buried layer capacitor of FIG. 1.
Figure 7:
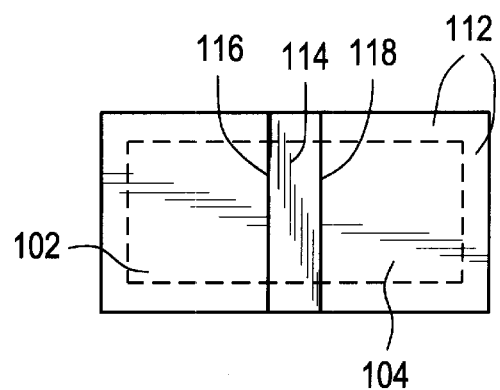
FIG. 7 is a bottom planar view of the capacitor of FIG. 6 taken along the line 7—7 of FIG. 6.
Figure 8:
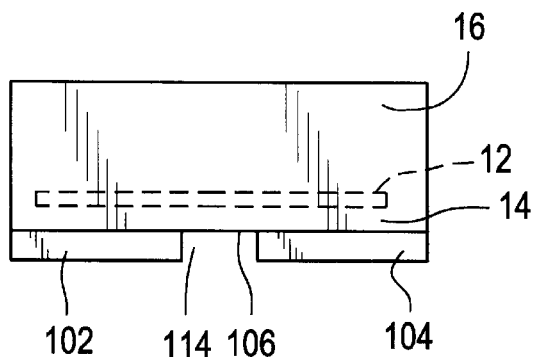
FIG. 8 is a side elevational view of the capacitor of FIG. 6.
Figure 9:
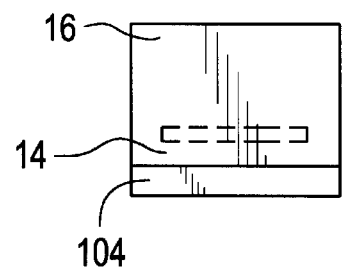
FIG. 9 is an end elevational view of the capacitor of FIG. 6.

An alternative embodiment of a capacitor generally designated 100 according to the invention is shown in FIGS. 6–9. In the capacitor embodiment 100, the contact members 18, 20 are replaced by a pair of metallized areas 102, 104 on a bottom surface 106 of the capacitor as shown in FIG. 8. The metallized areas 102, 104 function as terminations, each having a different polarity from the other, and facilitate mounting of the capacitor 100 directly to a printed circuit board. Elimination of the contacts members 18, 20 results in use of a minimum amount of circuit board area for the capacitor 100.

The capacitor 100 includes a first dielectric layer 14 and a second dielectric layer 16 and an electrode layer 12, each of which is generally similar to corresponding parts which have been described in connection with the embodiment depicted in FIGS. 1–5.

The capacitor 100 typically includes an electrode layer 12 made of palladium and metallized areas 102, 104 or terminals made of silver.

The following physical dimensions and capacitance values for the buried layer capacitor 100 should be considered as given by way of example and should not be considered as limiting in any way. The length dimension (as measured along edge 106) may range from 0.040 inches to 0.50 inches; the width (as measured along edge 108) may range from 0.020 inches to 0.50 inches; and the thickness (as measured along edge 110) may range from 0.010 to 0.10 inches.

Most typically, the capacitor 100 is manufactured in the following sizes:

TABLE 1

Typical Capacitor Sizes

| SIZE | LENGTH (inches) | WIDTH (inches) | THICKNESS (inches) |
| --- | --- | --- | --- |
| A | 0.060 | 0.050 | 0.030 |
| B | 0.120 | 0.100 | 0.080 |

The margin or barrier at the sides and at the ends of the electrode layer 12 as indicated by the reference numeral 112 in FIG. 7 may range from 0.005 inches to 0.010 inches. The gap between the terminations 102, 104 as indicated by the reference numeral 114 in FIGS. 6, 7 and 8 may range from 0.005 inches to 0.020 inches. The thickness of the dielectric layer 14 between the electrode layer 12 and the terminations 102, 104 may range from less than 0.001 inches to 0.010 inches.

Figure 15:
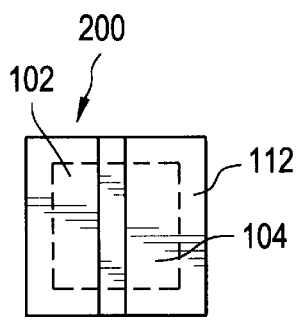
FIG. 15 is a bottom planar view of another embodiment of the buried layer capacitor of FIG. 1, similar to FIG. 7 and incorporating a square configuration.
Figure 16:
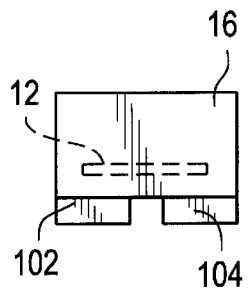
FIG. 16 is an end elevational view of the capacitor of FIG. 15.

In another alternative configuration generally designated 200 shown in FIG. 15, the length and width dimensions are made equal, thereby resulting in the square configuration of the buried layer capacitor 200.

Typical values for capacitance for a buried layer capacitor 100 having a size designated as Size A in Table 1 for various values of dielectric thickness, margin size, gap spacing and dielectric constant are shown in Table 2. The capacitance values shown are in pico Farads (pF) as measured between terminations 102, 104.

TABLE 2

Capacitance Values for Buried Layer Capacitors

| DIELECTRIC | | | DIELECTRIC CONSTANT | | | | |
| --- | --- | --- | --- | --- | --- | --- | --- |
| THICKNESS (inches) | MARGIN (inches) | GAP (inches) | K = 13 | K = 23 | K = 65 | K = 90 | K = 4000 |
| 0.001 | 0.005 | 0.010 | 1.1 pF | 2.3 pF | 5.7 pF | 7.8 pF | 351 pF |
| 0.010 | 0.005 | 0.010 | 0.1 pF | 0.4 pF | | | |
| 0.001 | 0.010 | 0.010 | 0.4 pF | | | | |

An important feature of the buried layer capacitor 100 is the ability to adjust or trim the value of capacitance in an efficient manner. The capacitance of the buried layer capacitor 100 can be adjusted by adjusting the gap 114 between the terminations 102, 104 each having a different polarity from the other. Such adjustment may be performed as a final part of a manufacturing process and eliminates need for contacting and trimming the electrode layer 12. This adjustment may be accomplished by trimming or cutting away a small portion of the terminations along the edges 116, 118 using conventional abrasion cutting or laser cutting equipment.

Figure 10:
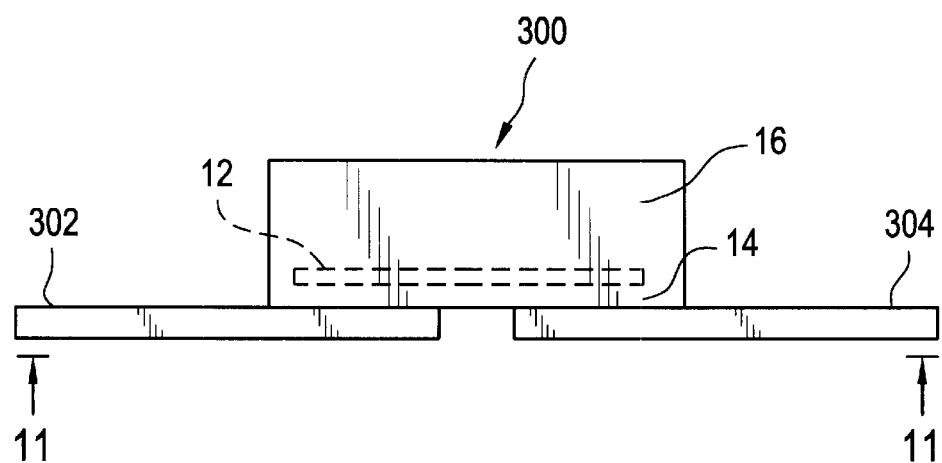
FIG. 10 is a side elevational view of an alternative embodiment of the buried layer capacitor of FIG. 1, incorporating a pair of axial leads.
Figure 11:
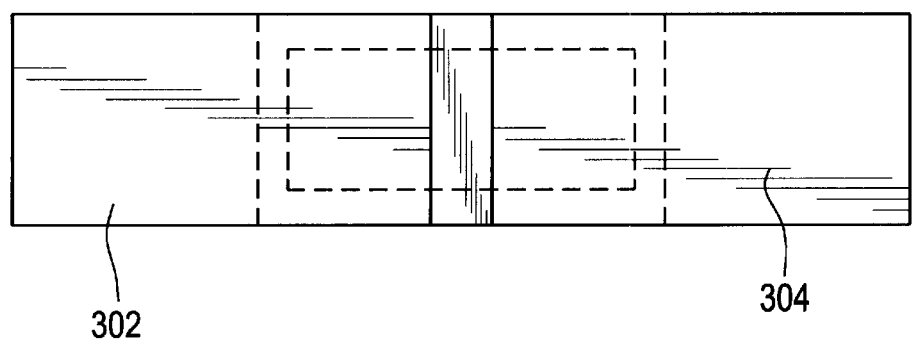
FIG. 11 is a bottom planar view of the capacitor of FIG. 10, taken along line 11—11 of FIG. 10.

FIGS. 10 and 11 show an alternative embodiment of the buried layer capacitor contacts members 300 which incorporates axial contacts members 302, 304. The axial contacts members 302, 304 provide an alternative mounting configuration.

Figure 12:
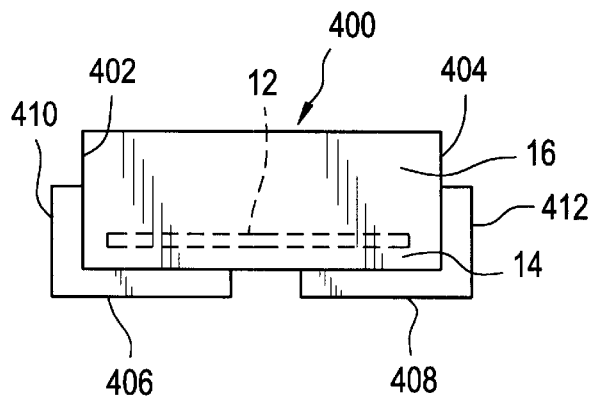
FIG. 12 is a side elevational view of another embodiment of the buried layer capacitor of FIG. 1, incorporating metallized portions, each having a different polarity from the other, on the end surfaces of the dielectric layers.
Figure 13:
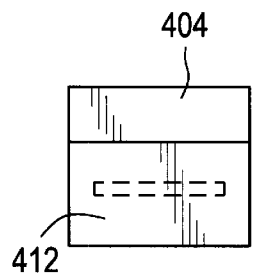
FIG. 13 is an end elevational view of the capacitor of FIG. 12.
Figure 14:
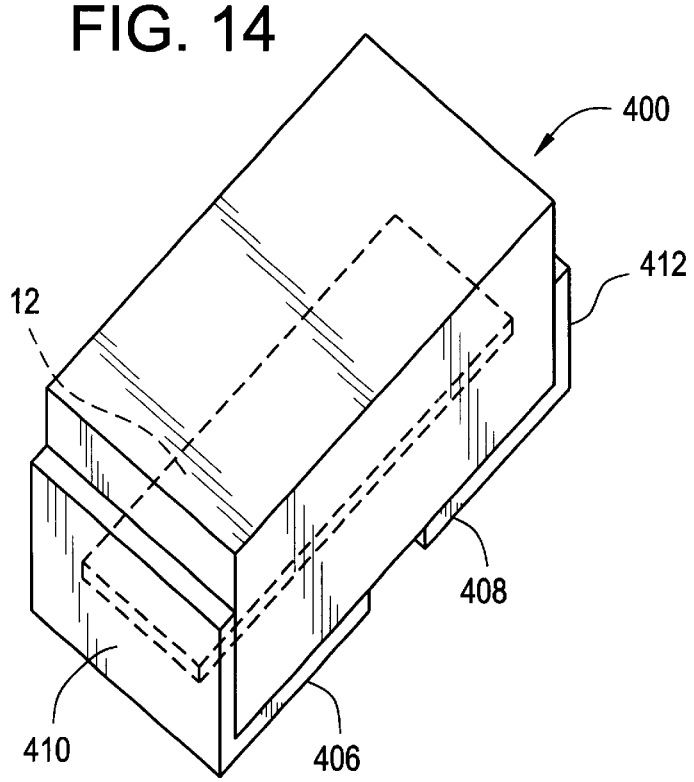
FIG. 14 is a perspective view of the capacitor of FIG. 12.

FIGS. 12–14 show another alternate embodiment of the buried layer capacitor generally designated 400 in which the metallized areas 102, 104 or cathode and anode shown in FIG. 6 have been modified to extend onto the end surfaces 402, 404 of the dielectric layers 14, 16. The terminations 406, 408 on the buried layer capacitor 400 facilitate the use of test equipment in which probes are placed on surfaces 410, 412 in order to measure performance characteristics of the capacitor 400.

Figure 17:
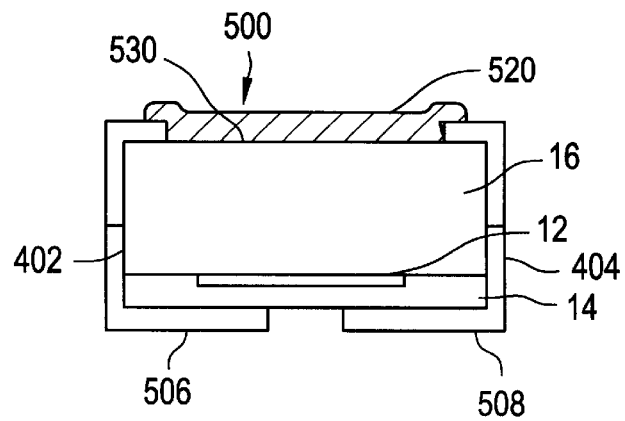
FIG. 17 is a cross-sectional view of an exemplary bypass circuit.

FIG. 17 shows an exemplary embodiment of the bypass circuit generally designated 500 in which a resistive layer 520 is added on the top surface 530 of dielectric layer 16. The resistive layer 520 is generally rectangular as is shown in FIG. 17, with length dimensions which are somewhat smaller than corresponding length dimensions of the dielectric layer 16. The contact members 506, 508 extend onto the end surfaces 402, 404 of the dielectric layers 14, 16, and further extend onto the top surface 530 of the dielectric layer 16, where an electrical connection is made with the resistive layer 520 as seen in FIG. 17, thereby adding a resistor in parallel to the buried layer capacitor.

Figure 18:
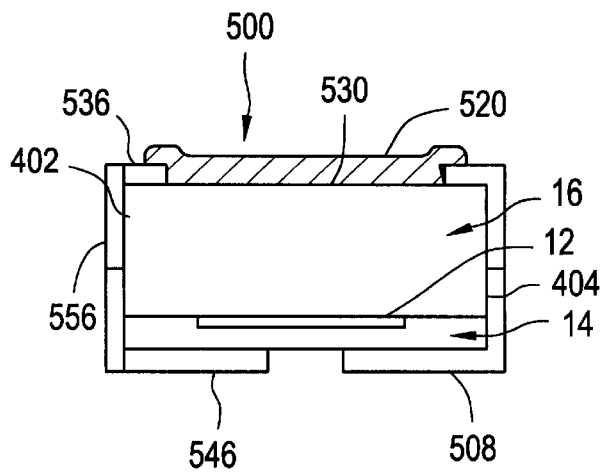
FIG. 18 is a cross-sectional view of an exemplary contact member.

One method of manufacturing a contact member can be seen in FIG. 18. The contact member is realized by printing a conductor pad 536 onto the top surface 530 of the dielectric layer 16, connecting a conductor pad 546 to dielectric layer 14, and applying conductor paste 556 to end surface 402 of the dielectric layers 14, 16, thereby achieving a connection between conductor pads 536 and 546 and creating an exemplary contact member.

Figure 19:
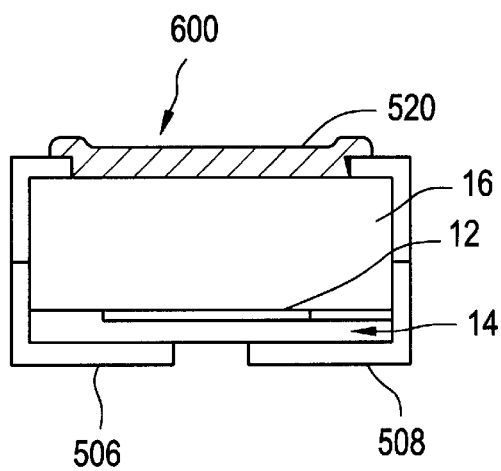
FIG. 19 is a cross-sectional view of an alternative embodiment of an exemplary bypass circuit.

FIG. 19 shows an alternative embodiment of the bypass circuit generally designated 600 in which the electrode layer 12 is extended through dielectric layers 14, 16 to electrically connect to contact member 508. This connection shorts the capacitor defined the electrode layer 12, the dielectric layer 14, and the contact member 508. Prior to the shorting, that capacitor was in a series connection with the capacitor defined by the electrode layer 12, the dielectric layer 14, and the contact member 506. If a first capacitor is defined with a capacitance of C1 and a second capacitor is defined with a capacitance of C2 and the first and second capacitors are in a series connection, the equivalent capacitance is equal to C1 times C2 divided by the sum of C1 plus C2. If C1 equals C2, then the equivalent capacitance is equal to ½ of C1 or C2, because they are of the same value. Thus, shorting one of the two series capacitors, as seen in FIG. 19, has the net effect of doubling the capacitance. The bypass circuit 600 functions the same mechanically and electrically as the bypass circuit generally designated 500, albeit with twice the capacitance.

The relatively thicker dielectric layer 16 contributes to overall ruggedness of the buried layer capacitors and bypass circuits generally designated 10, 100, 200, 300, 400, 500, 600, respectively thicker dielectric layer 16. This relationship makes it possible to handle these capacitors and circuits using conventional production type automatic handling equipment, even though the thickness of the dielectric layer 14 is in the range of 0.0001 inches to 0.01 inches.

A key feature of the buried layer capacitors and bypass circuits generally designate 10, 100, 200, 300, 400, 500, 600, respectively is their performances at very high frequencies. A typical capacitor made according to the prior art is useful up to approximately 11 gigaHertz (11 GHz). Tests performed on capacitors made according to the present invention indicate useful performance to 20 GHz and above.

The foregoing specific embodiments of the present invention as set forth in the specification herein are for illustrative purposes only. Various deviations and modifications may be made within the spirit and scope of this invention, without departing from a main theme thereof.

I claim:

1. A bypass circuit comprising:
   a first dielectric layer, with said first dielectric layer having a length dimension and a width dimension, and with said first dielectric layer having a first surface and a second surface;
   an electrode layer, with said electrode layer having a length dimension and a width dimension, with said length and width dimensions of said electrode layer smaller than said length and width dimensions respectively of said first dielectric layer, and with said electrode layer mounted on said first surface of said first dielectric layer, spaced from contact with any electrical conductor;
   a second dielectric layer, with said second dielectric layer having a length dimension and a width dimension and with said length and width dimensions of said second dielectric layer coextensive with said length and width dimensions respectively of said first dielectric layer, and with said second dielectric layer having a first surface and a second surface, said first surface of said second dielectric layer in contact with said first surface of said first dielectric surface;
   a resistive layer, with said resistive layer having a length dimension and a width dimension, with said length dimension of said resistive layer smaller than said length dimension of said second dielectric layer, and with said resistive layer mounted on said second surface of said second dielectric layer; and
   two spaced apart contact members with said contact members in contact with said second surface of said first dielectric layer, each of said contact members provided with a different polarity from that of said other contact member, with each of said contact members extending onto an end surface of said first and said second dielectric layers, and with each of said contact members contacting an opposite edge of said resistive layer.

2. A bypass circuit according to claim 1, in which said electrode layer is rectangular.

3. A bypass circuit according to claim 1, in which said first and said second dielectric layers are each rectangular.

4. A bypass circuit according to claim 1, in which each of said contact members projects beyond said width dimension of said first dielectric layer.

5. A bypass circuit according to claim 1, in which said electrode layer is square.

6. A bypass circuit according to claim 1, in which said first and said second dielectric layers are each square.

7. A bypass circuit according to claim 1, wherein said electrode layer extends outwardly to contact one of said contact members.

8. A method for producing a bypass circuit and comprising steps of:
   providing a first thin dielectric layer having a length dimension and a width dimension and a first surface and a second surface;
   providing an electrode layer with length and width dimensions smaller respectively than those of said first dielectric layer, the electrode layer mounted centrally on the first surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing a resistive layer on the second dielectric layer, the resistive layer having a length dimension smaller than that of the second dielectric layer, the resistive layer mounted centrally on the second surface of the second dielectric layer; and providing two spaced apart electrical contact members in contact with the second surface of the first dielectric layer, each of the contact members being provided with a different polarity from that of the other contact member, with each of the contact members extending onto an end surface of the first and the second dielectric layers, and with each of the contact members contacting an opposite edge of the resistive layer.

9. A bypass circuit according to claim 8, in which each of said pair of electrically conductive areas is rectangular.

10. A bypass circuit according to claim 8, in which each of said electrically conductive areas comprises a metallized area.

11. A bypass circuit according to claims 8, in which said electrode layer is rectangular.

12. A bypass circuit according to claim 8, in which said first and second dielectric layers are each rectangular.

13. A bypass circuit according to claim 8, in which said electrode layer is square.

14. A bypass circuit according to claim 8, in which said first and said second dielectric layers are each square.

15. A bypass circuit according to claim 8, wherein the electrode layer extends outwardly to contact one of the contact members.

16. A method for producing a bypass circuit and comprising steps of:

providing a first thin dielectric layer having a length dimension and a width dimension and a first surface and a second surface;

providing an electrode layer with length and width dimensions smaller respectively than those of said first dielectric layer, the electrode layer mounted centrally on the top surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing a resistive layer on the second dielectric layer on the opposite side from the electrode layer, the resistive layer having a length dimension smaller than that of the second dielectric layer, and with the resistive layer mounted centrally on the second dielectric layer; and providing two trimmed spaced apart electrical contact members on the second surface of the first dielectric layer, each of said contact members being provided with a different polarity from that of said other contact member so as to provide predetermined operative characteristics to the capacitor, with each of the contact members extending onto an end surface of the first and the second dielectric layers, and with each of the contact members contacting an opposite edge of the resistive layer.

17. A bypass circuit according to claim 16, wherein the electrode layer extends outwardly to contact one of the contact members.

18. A method for producing a bypass circuit and comprising steps of:

providing a first thin dielectric layer having a length dimension and a width dimension and a first surface and a second surface;

providing an electrode layer with length and width dimensions smaller respectively than those of said first dielectric layer, the electrode layer mounted centrally on the top surface of the first dielectric layer with said electrode layer spaced from contact with any electrical conductor;

providing a second dielectric layer on the electrode layer on the opposite side from the first dielectric layer for ruggedness, the second dielectric layer having length and width dimensions coextensive with those of said first dielectric layer so that said dielectric layers combine to describe a margin outward of the electrode layer;

providing a resistive layer on the second dielectric layer on the opposite side from the electrode layer, the resistive layer having a length dimension smaller than that of the second dielectric layer, and with the resistive layer mounted centrally on the second dielectric layer; and providing two spaced apart electrical contact members on the second surface of the first dielectric layer, each of said contact members being provided with a different polarity from that of said other contact member, the contact members sized and spaced so as to provide predetermined operative characteristics to the capacitor, with each of the contact members extending onto an end surface of the first and the second dielectric layers, and with each of the contact members contacting an opposite edge of the resistive layer.

19. A bypass circuit according to claim 18, wherein the electrode layer extends outwardly to contact one of the contact members.

* * * * *